United States Patent
Kadambala et al.

(10) Patent No.: US 10,628,184 B2
(45) Date of Patent: Apr. 21, 2020

(54) KPI AWARE COMPLEX ENTERPRISE APPLICATIONS WITH COGNITIVE ABILITIES TO MAXIMIZE PRODUCTIVITY

(71) Applicant: International Business Machines Corporation, Armonk, NY (US)

(72) Inventors: Hemanth Kumar Choudhary Kadambala, Ap (IN); Hari Bheemavarapu, Littleton, MA (US); Rakesh Birudugadda, Ap (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 15/835,969

(22) Filed: Dec. 8, 2017

(65) Prior Publication Data
US 2019/0179649 A1    Jun. 13, 2019

(51) Int. Cl.
| | |
|---|---|
| G06F 9/44 | (2018.01) |
| G06F 9/451 | (2018.01) |
| H04L 29/08 | (2006.01) |
| G06Q 10/06 | (2012.01) |
| G06F 3/0482 | (2013.01) |
| G06N 20/00 | (2019.01) |

(52) U.S. Cl.
CPC ............ *G06F 9/453* (2018.02); *G06F 3/0482* (2013.01); *G06N 20/00* (2019.01); *G06Q 10/0633* (2013.01); *G06Q 10/06393* (2013.01); *H04L 67/22* (2013.01)

(58) Field of Classification Search
CPC ....... G06F 3/0482; G06F 9/453; G06N 20/00; G06Q 10/0633; G06Q 10/06393; H04L 67/22
See application file for complete search history.

(56) References Cited

U.S. PATENT DOCUMENTS

| | | |
|---|---|---|
| 6,452,607 B1 | 9/2002 | Livingston |
| 6,687,485 B2 | 2/2004 | Hopkins et al. |
| 7,526,458 B2 | 4/2009 | Flinn et al. |
| 7,571,161 B2 | 8/2009 | Watson |
| 7,650,316 B2 | 9/2010 | Peck et al. |
| 9,063,757 B2 | 6/2015 | Horton et al. |
| 2003/0229608 A1 | 12/2003 | Reynar et al. |

(Continued)

FOREIGN PATENT DOCUMENTS

| | | |
|---|---|---|
| WO | 2013052821 A1 | 4/2013 |
| WO | 2014117345 A1 | 8/2014 |

*Primary Examiner* — Seth A Silverman
(74) *Attorney, Agent, or Firm* — Richard Wilhelm; Edell, Shapiro & Finnan, LLC

(57) ABSTRACT

A method, a system and a computer program product are provided. A computing system learns structures and workflows of an enterprise application based on historic usage data and configuration data. The computing system determines that the user needs help based on one or more of an occurrence of a timeout based on a lack of user input regarding the enterprise application, differences in a navigational pattern of the user as compared with navigational patterns of other users, and a relationship regarding the navigational pattern of the user and the objectives. Upon determining that the user needs help, guidance is provided to the user via an interactive user interface. A type of guidance offered depends on how the user needing the help was determined.

20 Claims, 8 Drawing Sheets

(56) References Cited

U.S. PATENT DOCUMENTS

| | | | |
|---|---|---|---|
| 2006/0259861 A1* | 11/2006 | Watson | G06F 16/951 715/705 |
| 2010/0169119 A1* | 7/2010 | Hussain | G06Q 10/06 705/3 |
| 2011/0246880 A1* | 10/2011 | Horton | G06F 9/453 715/708 |
| 2012/0110579 A1 | 5/2012 | Bullen | |
| 2013/0189962 A1* | 7/2013 | Okolo | G06Q 10/10 455/414.1 |
| 2017/0116552 A1* | 4/2017 | Deodhar | G06Q 10/06316 |
| 2017/0132331 A1 | 5/2017 | Pepakayala et al. | |

* cited by examiner

KPI AWARE COMPLEX ENTERPRISE APPLICATIONS WITH COGNITIVE ABILITIES TO MAXIMIZE PRODUCTIVITY

BACKGROUND

1. Technical Field

Present invention embodiments relate to providing machine learning for enterprise resource planning applications. In particular, present invention embodiments relate to enterprise resource planning applications with machine learning such that the enterprise resource planning applications determine when a user needs help and offers assistance or suggestions for the user automatically.

2. Discussion of the Related Art

Enterprise Resource Planning (ERP) applications come in different sizes, configurations and workflows depending upon an organization's structure and needs. Much time, energy, and resources are used to train people to efficiently use these ERP applications. The ERP applications are mission-critical applications that are Key Performance Indicator (KPI) driven. Functioning of an organization, as well as revenues, are directly influenced by use of the ERP applications.

Although users may spend many hours training to use such ERP applications, due to complexity of the ERP applications, users often get stuck in various workflows not knowing what to do next. Further, in such applications, it is easy for a user to lose track of proper objectives and efficient ways to achieve these objectives. Often, the users are unable to find help within their organizations. Instead, the users reach out to vendors with questions about basic operations of the ERP applications. As a result, the users, as well as the vendors, lose productivity, which directly impacts revenue.

Small and medium enterprises tend to stay away from complex ERP applications and, instead, compromise by using relatively simple ERP applications that have very limited features and workflows. Small and medium enterprise users of such relatively simple ERP applications often become frustrated and unmotivated by the limitations of these applications.

SUMMARY

According to one aspect of the present invention, a computer-implemented method for using machine learning to aid a user of an enterprise application is provided. A computing system learns structures and workflows regarding the enterprise application based on historic usage data and configuration data. The computing system determines that the user needs help using the enterprise application based on one or more of an occurrence of a timeout based on a lack of user input regarding the enterprise application, differences in a navigational pattern of the user as compared with navigational patterns of other users, and a relationship regarding the navigational pattern of the user and the objectives. Upon determining that the user needs help, guidance is provided to the user via an interactive user interface. A type of guidance offered to the user depends on how the enterprise resource planning application determined that the user needs the help.

According to a second aspect of the present invention, a system is provided that aids a user of an enterprise station. The system includes, among other things, at least one processing unit and at least one memory connected to the at least one processing unit. The at least one processing unit is configured to: learn structures and workflows regarding the enterprise application based on historic usage data and configuration data; determine that a user needs help using the enterprise application based on one or more of an occurrence of a timeout based on a lack of user input regarding the enterprise application, differences in a navigational pattern of the user as compared with navigational patterns of other users, and a relationship regarding the navigational pattern of the user and the objectives. Upon determining that the user needs help, guidance is provided to the user via an interactive user interface. A type of guidance offered to the user depends on how the enterprise resource planning application determined that the user needs help.

According to a third aspect of the present invention, a computer program product is provided. The computer program product includes at least one computer readable storage medium having computer readable program code embodied therewith for execution on at least one processor. The computer readable program code is configured to be executed by the at least one processor to perform: learning structures and workflows regarding an enterprise application based on historic usage data and configuration data; determining that a user needs help using the enterprise application based on one or more of an occurrence of a timeout based on a lack of user input regarding the enterprise application, differences in a navigational pattern of the user as compared with navigational patterns of other users, and a relationship regarding the navigational pattern of the user and the objectives. Upon determining that the user needs help, the at least one processor provides guidance to the user via the interactive user interface, a type of guidance being offered to the user depending on how the enterprise resource planning application determined that the user needs the help.

BRIEF DESCRIPTION OF THE DRAWINGS

Generally, like reference numerals in the various figures are utilized to designate like components.

DETAILED DESCRIPTION

A system, method and computer program product are provided that uses machine learning with an ERP application to learn about workflows, navigation paths, user-defined paths, objectives and priorities. Configuration data, historic usage data and historic performance data may be analyzed such that role-based objectives, workflows, navigation paths and priorities may be learned. Present embodiments may determine when a user is stuck or has strayed from his or her objectives and may automatically offer guidance via an interactive user interface. Various embodiments may monitor performance via key performance indicators (KPIs) and may suggest actions to take when the KPIs show that performance is decreasing. In addition, the present invention embodiments may analyze the historic performance data to determine whether a better set of KPIs exist and, if so, may suggest that the KPIs be changed to the better set of KPIs.

Figure 1:
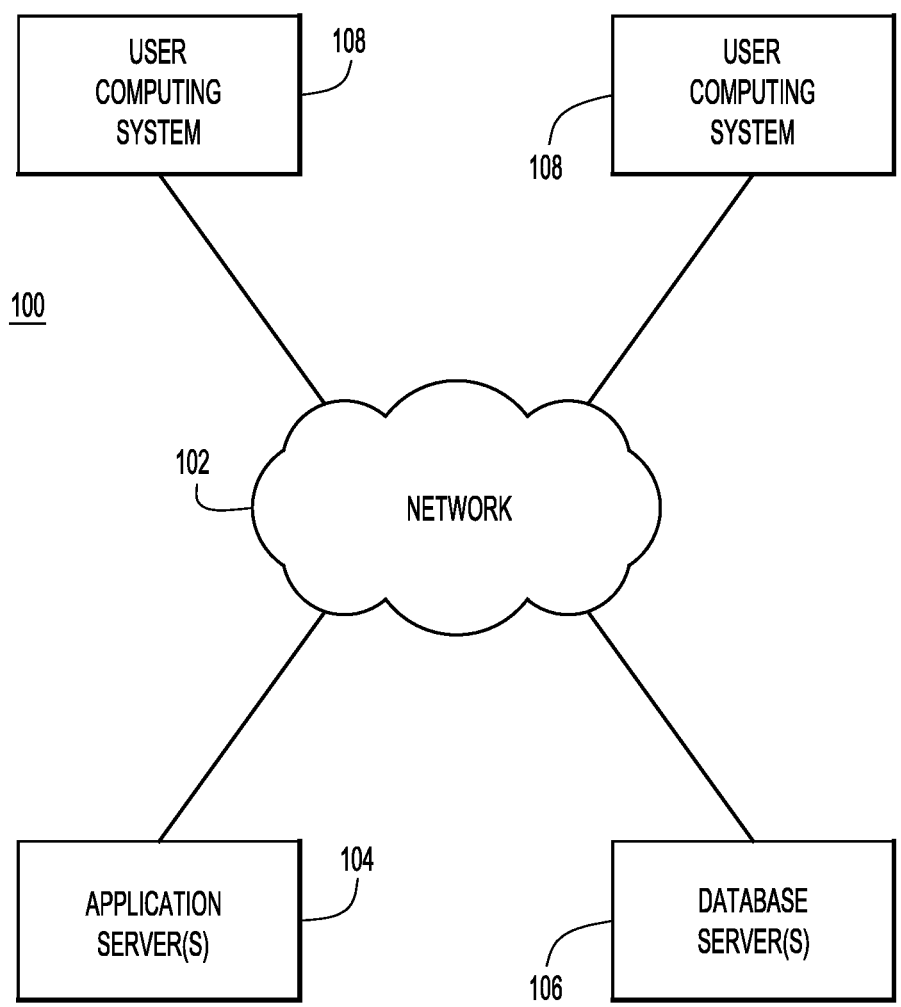
FIG. 1 illustrates an example environment in which embodiments of the invention may operate.

An example environment for use with present invention embodiments is illustrated in FIG. 1. Specifically, the environment includes one or more application server systems 104, one or more database server systems 106 and one or more user computing systems 108. One or more application server systems 104, one or more database server systems 106 and one or more user computing systems 108 may be remote from each other and may communicate over a network 102. The network may be implemented by any number of any suitable communications media (e.g., wide area network (WAN), local area network (LAN), Internet, Intranet, etc.). Alternatively, one or more application server systems 104, one or more database server systems 106 and one or more user computing systems 108 may be local to each other, and may communicate via any appropriate local communication medium (e.g., local area network (LAN), hardwire, wireless link, Intranet, etc.).

One or more database server systems may include various databases for use by ERP applications and machine learning. One or more database server systems 106 may be implemented by any conventional or other database or storage unit. One or more application server systems 104 may provide information for presenting a graphical user or other interface (e.g., command line prompts, menu screens, etc.) via one or more user computing systems 108 to receive information from users of the ERP applications, to provide information to the users of the ERP applications and to provide help and guidance to the users of the ERP applications.

In some embodiments, application server system 104, database server system 106 and user computing system 108 may be included in a single physical computing system.

Figure 2:
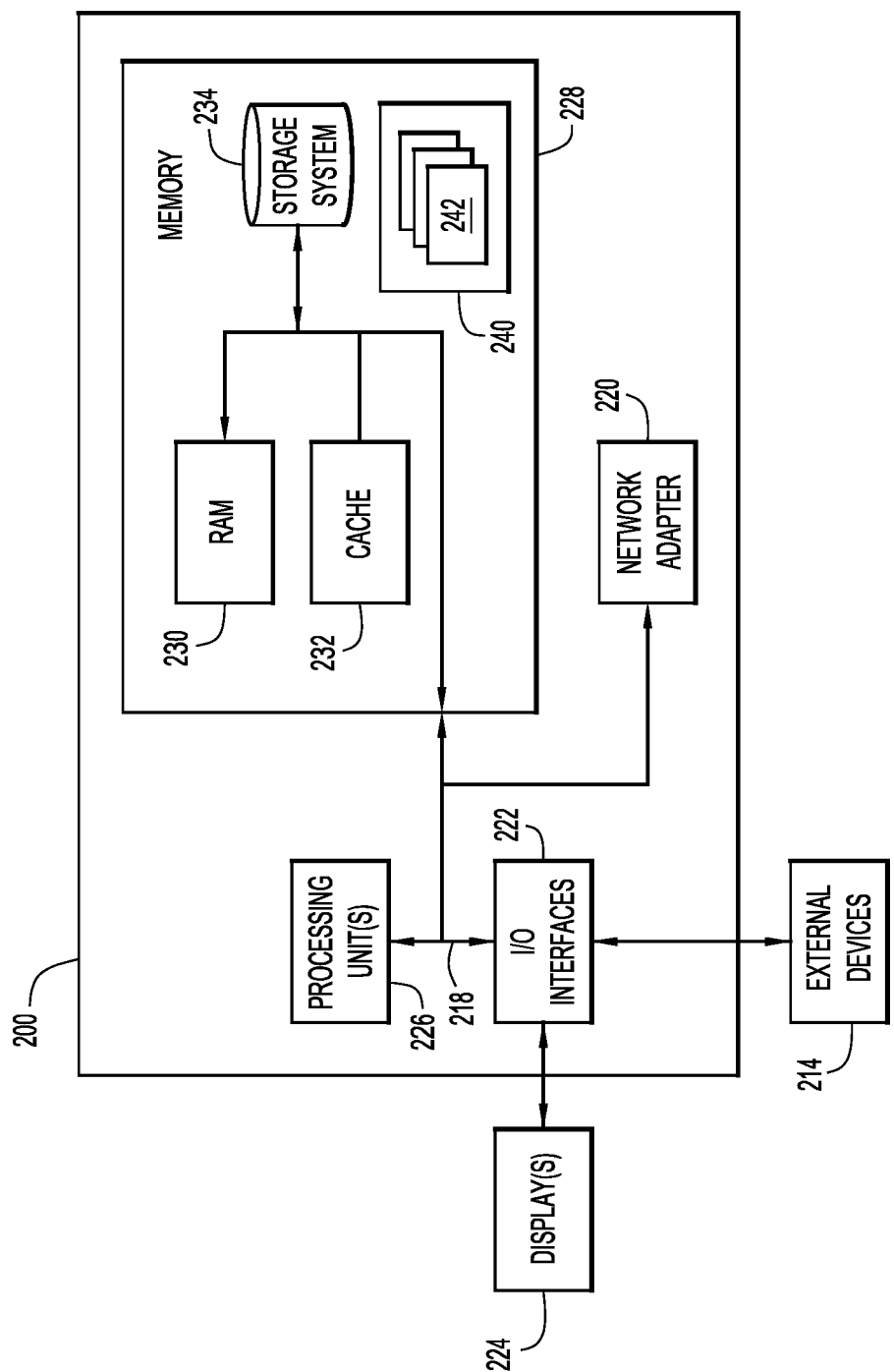
FIG. 2 is a functional block diagram of a computing system on which an application server, a database server and a user computing system may be implemented according to embodiments of the invention.

FIG. 2 is a functional block diagram of a computing system 200 that may implement one or more application server systems 104, one or more database server systems 106 and one or more user computing systems 108 in various embodiments of the invention. Computing system 200 is shown in a form of a general-purpose computing device. Components of computing system 200 may include, but are not limited to, one or more processors or processing units 226, a system memory 228, and a bus 218 that couples various system components including system memory 228 to one or more processing units 226.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 typically includes a variety of computer system readable media. Such media may be any available media that is accessible by computing system 200, and may include both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic media (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, one or more displays 224, one or more devices that enable a user to interact with computing system 200, and/or any devices (e.g., network card, modem, etc.) that enable computing system 200 to communicate with one or more other computing devices. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with the other components of computing system 200 via bus 218. It should be understood that, although not shown, other hardware and/or software components could be used in conjunction with computing system 200. Examples, include, but are not limited to: microcode, device drivers, redundant processing units, external disk drive arrays, RAID systems, tape drives, and data archival storage systems, etc.

Figure 3:
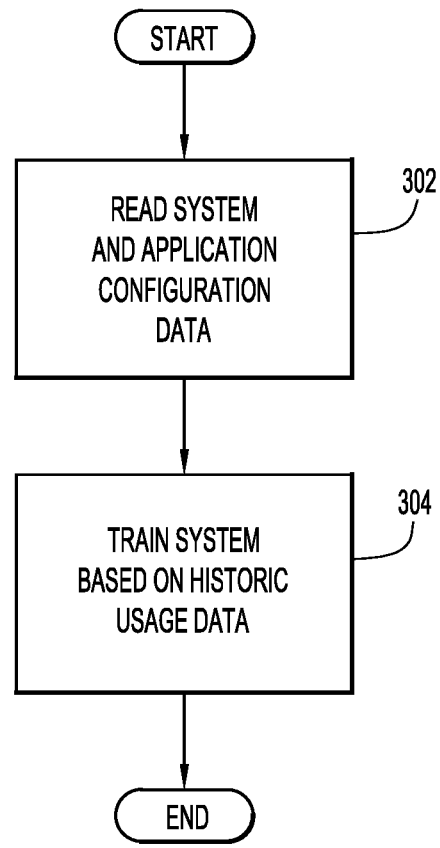
FIG. 3 is a flowchart of an example process for training a system according to embodiments of the invention.

FIG. 3 is a flowchart illustrating a training phase of the present invention embodiments. System configuration data and ERP application configuration data may be read and analyzed (act 302) such that embodiments may learn information regarding the system configuration and the ERP application configurations. By reading the system configuration data and the ERP application data, the ERP application learns about the system as well as the ERP application such as, for example, what ERP application modules are installed, what display screens are available and any hierarchical structure of display screens.

Next, embodiments may be trained based on historic usage data (act 304). For example, the historic usage data may be analyzed to learn role-based navigation patterns, role-based workflows, user-defined navigation patterns, role-based objectives, etc. via machine learning.

Training may be performed periodically such as, for example, daily, weekly, monthly, or some other time period. In some embodiments, training may be performed based on historic usage data collected since training was performed previously.

When a user accesses the ERP application, the user may be requested to provide identifying information including, but not limited to, a UserID and a password. The ERP application may permit only certain authorized users to perform special functions such as, for example, specifying key performance indicators, role-based objectives, role-based navigation flows and role-based workflows.

In various embodiments, the ERP application may include an idle timer such that the idle timer may be started when the user's computing device receives and displays a new display screen from the ERP application. Each time the user provides requested information on the display screen, the idle timer may be reset. The idle timer may be stopped after the user completes entering the requested information on the display screen. When the idle timer expires, the ERP application may assume that the user is stuck and does not know what to do next.

Figure 4:
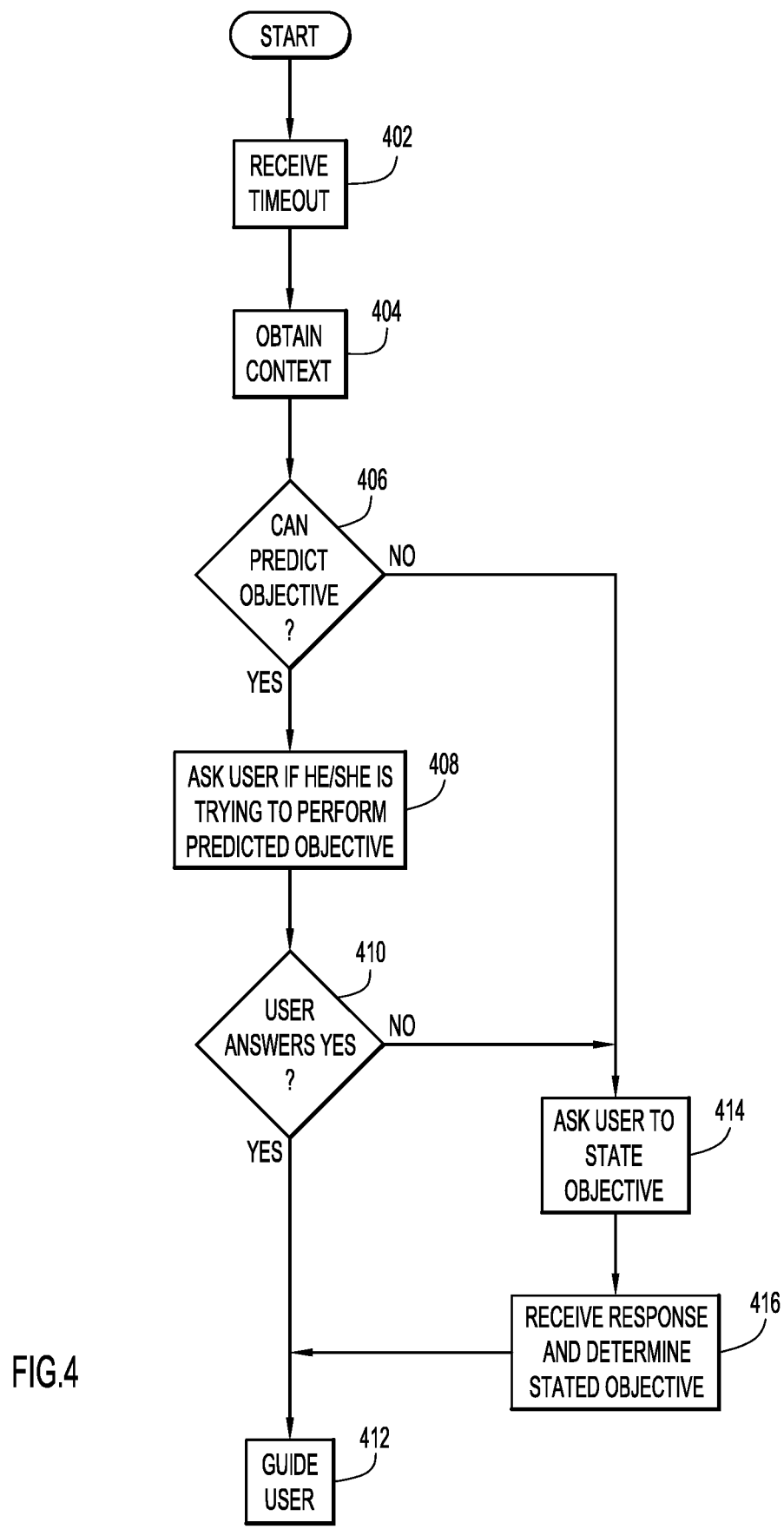
FIG. 4 is a flowchart of an example process, according to embodiments of the invention, for determining that a user needs help based on the user not providing any input over a predefined time period.

FIG. 4 is a flowchart of an example process for processing a timeout of the idle timer while the user computing system displays a display screen on which all requested information has not yet been provided. The process may begin by receiving an indication that the idle timer expired (act 402). In response to receiving the indication, a context in which the idle timer expired may be obtained (act 404). One or more application servers 104 may maintain a context for each user using the ERP application. The context may include, but not be limited to, a current display screen, information entered on the current display screen, previous display screens for a current session, any jobs or tasks defined during the session, a role of the current user and a current navigation pattern.

After obtaining the context, the ERP application may attempt to match a current navigation pattern of the user with a role-based navigation pattern, which may be a learned navigation pattern. The ERP application may attempt to predict an objective of the user based on a closest matching navigation pattern from the historical user data (act 406).

If the ERP application is able to predict an objective of the user, the ERP application may ask the user, via an interactive user interface, if the user is attempting to perform the predicted objective (act 408). If the user provides an affirmative answer, via the interactive user interface (act 410), then the ERP application may provide guidance to the user to achieve the predicted objective (act 412). The guidance may include step-by-step instructions provided through the interactive user interface. In some embodiments, the guidance may include a selectable object, which when selected by the user, indicates to the ERP application to automatically perform actions to achieve the predicted objective.

If, in response to act 408, the user answers negatively (act 410) or the system cannot predict the objective (act 406), then the ERP application may request the user to indicate his or her objective via the interactive user interface, which further may include a natural language dialog capability (act 414). After the ERP application receives a response from the user, via the interactive interface, the ERP application may determine the objective (act 416) and may provide guidance to the user for achieving the objective (act 412).

Figure 5:
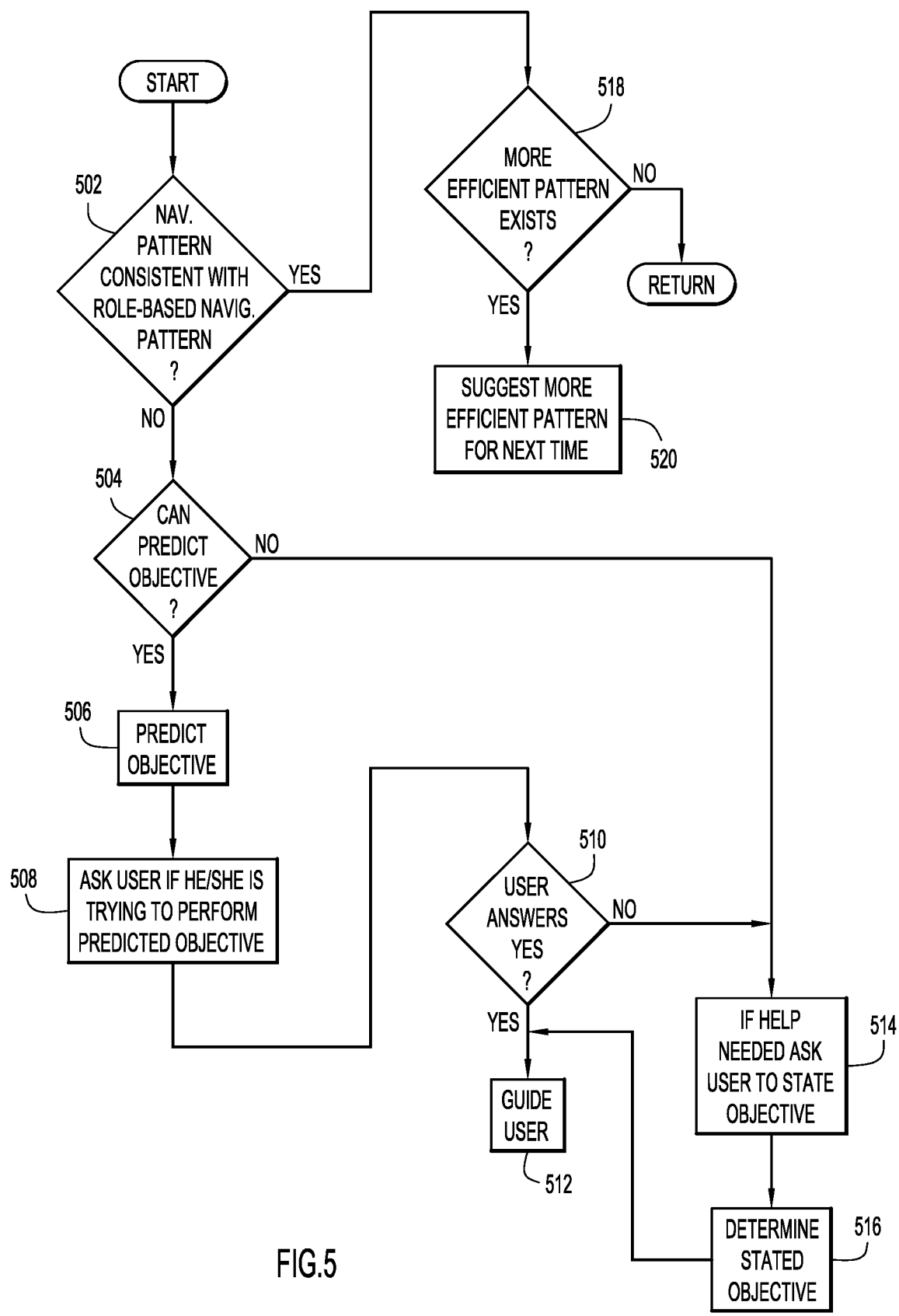
FIG. 5 is a flowchart that illustrates an example process, according to embodiments of the invention, for determining whether a navigation pattern of a user is inconsistent with a role-based navigation pattern and for offering help if the navigation pattern is determined to be inconsistent with the role-based navigation pattern.

FIG. 5 is a flowchart of an example process, according to embodiments of the invention, for determining whether a navigation pattern of a user is inconsistent with a role-based navigation pattern and for offering help if the navigation pattern is determined to be inconsistent with the role-based navigation pattern. While the user is using the ERP application, a determination may be made regarding whether a current navigation pattern of the user is consistent with a role-based navigation pattern for the user's role (act 502). If the current navigation pattern is determined to not be consistent with the role-based navigation pattern, then the ERP application may determine whether an objective of the user can be predicted (act 504). To predict the objective, the ERP application may attempt to match the current navigation pattern with a closest matching navigation pattern based on the historical usage data. The objective may then be predicted based on the closest matching navigation pattern.

If the ERP application determines that it is able to predict an objective, then the ERP application predicts the objective (act 506).

The ERP application may then ask the user, via the interactive user interface, if the user is trying to perform the predicted objective (act 508). If the user answers affirmatively (act 510), then the ERP application may guide the user to achieve the objective (act 512).

If the ERP application determines, during act 510, that the user answers negatively or the system cannot predict the objective (act 504), then the ERP application may ask the user, via the interactive user interface, if the user needs help, and if so, may ask the user what his or her objective is (act 514). The ERP application may then determine the objective based on the objective provided by the user during act 514 (act 516), and the ERP application may then provide guidance to the user regarding achieving the objective (512).

If, during act 502, the ERP application determines that the navigation pattern of the user is consistent with a role-based navigation pattern, then the ERP application may determine whether a more efficient navigation pattern exists based on the historical usage data and any user-defined patterns (act 518). This may be achieved by associating each role-based navigation pattern with an objective during training and determining whether a more efficient navigation pattern (i.e., a navigation pattern with fewer steps) exists for a role matching the role of the current user with an objective that matches a predicted objective of the current navigation pattern. If a more efficient role-based navigation pattern exists, then the ERP application may suggest to the user, via the interactive user interface, that the user use the more efficient navigation pattern in the future with instructions for using the more efficient role-based navigation pattern (act 520).

In some embodiments, the ERP application may associate the more efficient role-based navigation pattern with the user and, when the user appears to be attempting to achieve the objective associated with the more efficient role-based navigation pattern, the ERP application may provide a selectable object on the display screen of the user computing system, which the user may select via the interactive user interface. Upon selection of the object, the ERP application may guide the user through the more efficient role-based navigation pattern.

Figure 6:
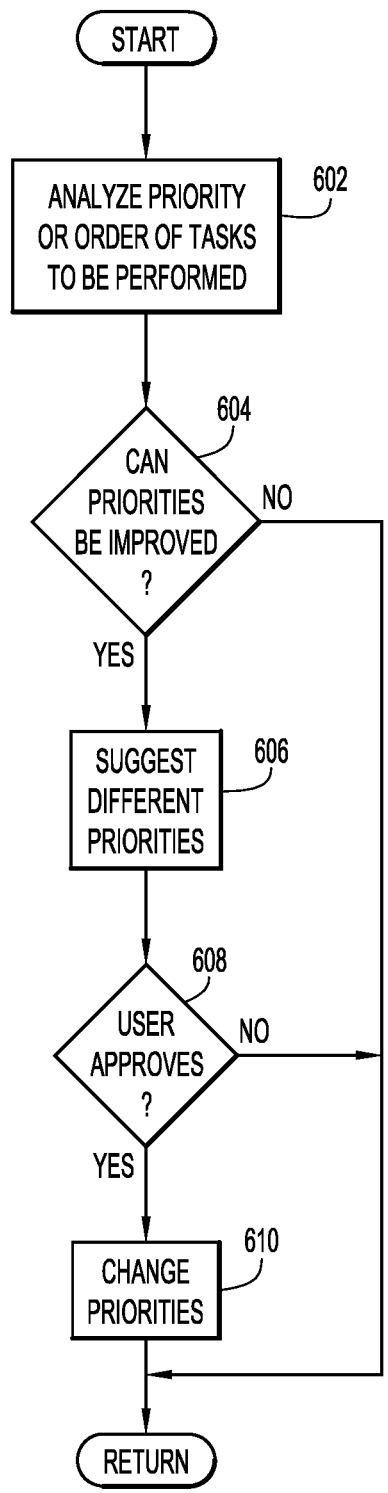
FIG. 6 is a flowchart of an example process, according to embodiments of the invention, for analyzing priorities or an ordering of tasks to be performed and suggesting different priorities or a different ordering to improve a workflow.

While the user is using the ERP application, the user may define a number of tasks and a priority, or order, in which the tasks are to be performed. FIG. 6 is a flowchart of an example process for analyzing the priority, or order, for performing the tasks and suggesting different priorities, or a different order, for performing the tasks, when the ERP application predicts that the different order or the different priorities would improve performance of the tasks according to embodiments of the invention.

The process may begin by analyzing a priority or an order of the tasks to be performed (act 602). The ERP application may determine whether the priorities or order can be improved to provide a better task flow (act 604). If the ERP application determines that the user-defined priorities or order could be rearranged to improve the task flow, then the ERP application may suggest different priorities or a different task order via the interactive user interface (act 606). The user may then approve the different priorities or task order, via the interactive user interface (act 608), and the ERP application may change the priorities or the task order (act 610). If, during act 608, the ERP application determines that the user does not approve of the different priorities or the different task order, then the ERP application may leave the priorities or the order unchanged.

For example, if the ERP application includes a human resources module and the user-defined priorities for the tasks includes priorities for tasks related to hiring a person for each of job positions A, B, C and D, in priority order from high to low, the ERP application may analyze the historical usage data to determine a time to hire for each of the job positions. If the ERP application determines that, based on the determined time to hire for each of the job positions, the priority or order of performing the tasks should be changed, then the ERP application may suggest different priorities or a different ordering for the tasks via the interactive user interface.

In some embodiments, the ERP application may monitor changes in values of KPIs and may make recommendations based on the monitored changes. For example, using a Human Resources (HR) module for a ERP application, a KPI may include timely closing of critical open positions with high quality candidates to maximize returns. The timely closing may be defined as filling an open position within 30 days, or some other time period. Other examples of KPIs may include, but not be limited to, effective resource planning to maximize returns and speeding up of at least some of the KPIs.

Figure 7:
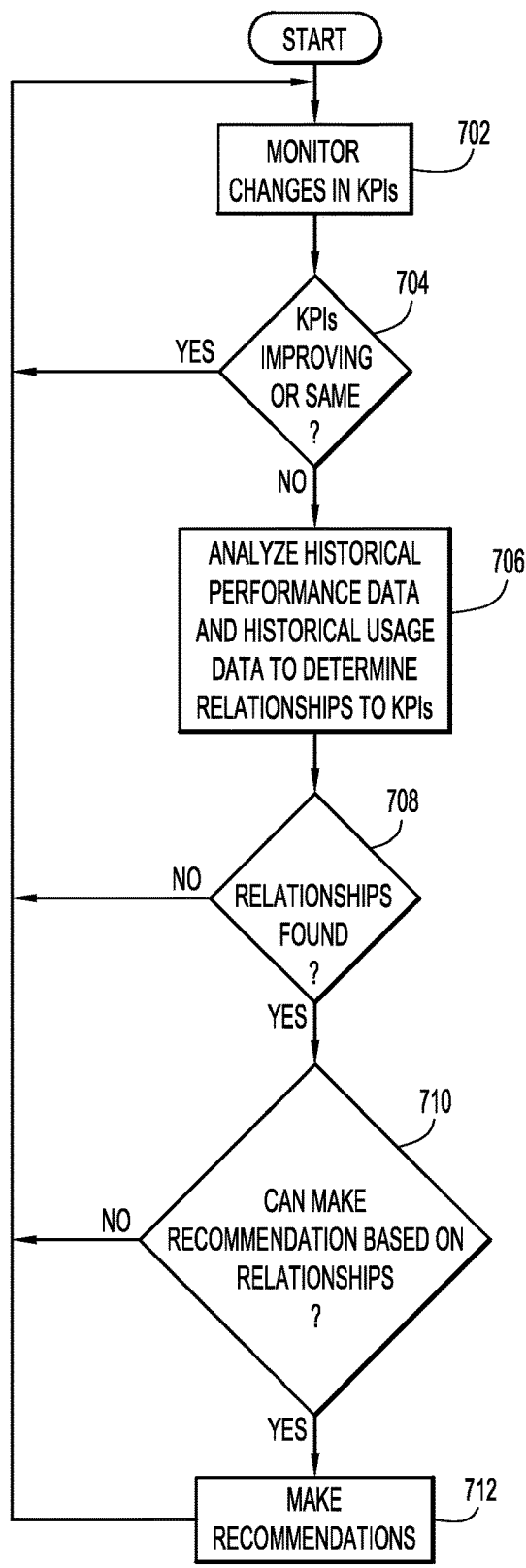
FIG. 7 illustrates an example process for monitoring key performance indicators, analyzing historical performance data and historical usage data to determine relationships to the key performance indicators and recommending actions to improve values of the key performance indicators according to embodiments of the invention.

FIG. 7 illustrates an example process for monitoring KPIs and making recommendations based on changes in values of the KPIs according to embodiments of the invention. The process may begin by monitoring KPIs for value changes (act 702). If any changes are found, a determination may be made regarding whether the KPIs are either improving, degrading or unchanging (act 704). If all of the KPIs are either improving or unchanging, then the process may continue to monitor for changes in the KPIs (act 702). Otherwise, the ERP application may analyze historical performance data and historical usage data to determine whether any actions are related to any KPIs improving or degrading (act 706). If the ERP application determines that no actions are related to the KPIs improving or degrading (act 708), then monitoring for changes in the KPIs may continue (act 702). Otherwise, based on the determined relationships, the ERP application may determine whether any actions can be recommended to improve the KPIs (act 710). If no actions can be recommended, then monitoring of changes in values of the KPIs may continue (act 702). Otherwise, the ERP application may make recommendations to the user, via the interactive user interface (act 712), and may continue monitoring for changes in values of the KPIs (act 702).

Figure 8:
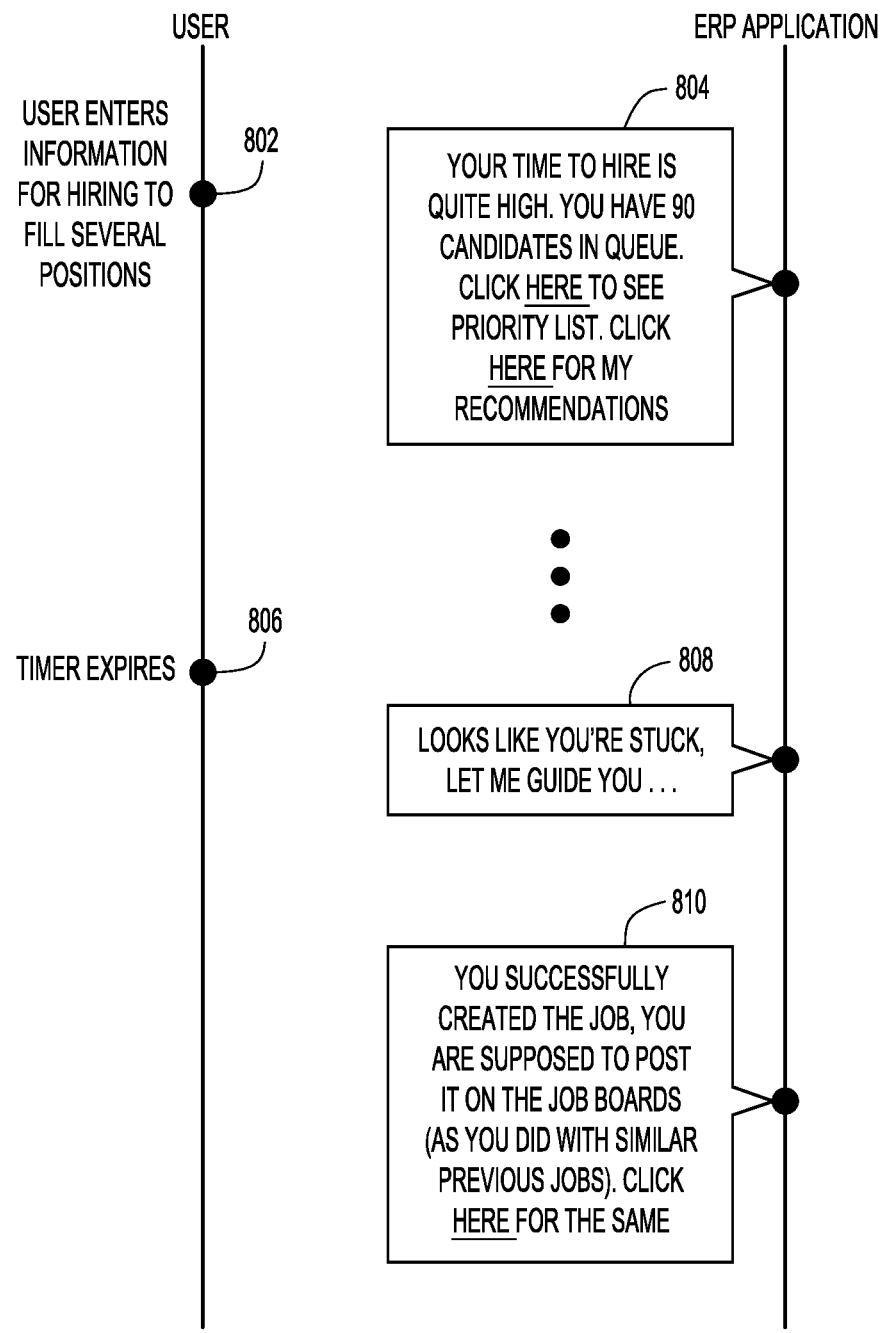
FIG. 8 illustrates an example interactive user interface according to embodiments of the invention.

FIG. 8 illustrates a portion of an example session between a user and the ERP application. The example session assumes that the ERP application has a human resources module, which is not a requirement for embodiments of the invention. The example session assumes that the user completed entering information for hiring people to fill several open positions and that the user had entered priorities for the respective tasks for filling the several open positions 802. The ERP application may analyze the historical usage data and may determine a recommended set of different priorities than those entered by the user. As a result, the ERP application may communicate to the user via the interactive user interface and may indicate to the user, for example, that the time to hire is quite high and that there are 90 candidates in the queue for the open positions 804. The communication from the ERP application may further give the user an opportunity to make a selection with, for example, a pointing device, to either see a priority list or see recommendations from the ERP application.

At a later point in the session, the user may pause while entering data and an idle timer may expire 806. At this point, the ERP application may obtain a context in which the idle timer timed out and may communicate with the user through the interactive user interface with a message such as, for example, "Looks like you're stuck, let me guide you . . . " 808.

Later in the session, after the user successfully created a job or task, the ERP application may communicate with the user via the interactive user interface with a message indicating that the user successfully created the job and that the user should post the job on job boards as was done previously and may further provide an option for the user to make a selection via, for example, a pointing device, to have the ERP application post the job to the job boards 810. In some embodiments, communication 810 may be triggered by an idle timer expiring after the user created the job.

It will be appreciated that the embodiments described above and illustrated in the drawings represent only a few of the many ways of implementing embodiments. The environment of the present invention embodiments may include any number of computer or other processing systems and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for using machine learning to aid a user of an enterprise resource planning application, the computer-implemented method comprising:
    learning, by a computing system, structures and workflows regarding the enterprise resource planning application based on historic usage data, system configuration data, and enterprise resource planning application configuration data, the learning further comprising:
        analyzing the historic usage data to learn, via machine learning, role-based navigation patterns, role-based workflows, and user-defined navigation patterns;
    determining, by the computing system, that the user needs help using the enterprise resource planning application based on one or more of an occurrence of a timeout based on a lack of user input regarding the enterprise resource planning application, differences in a navigation pattern of the user as compared with navigation patterns of other users with respect to use of the enterprise resource planning application, and a relationship regarding the navigation pattern of the user and objectives;
    upon determining that the user needs the help, providing by the computing system, guidance to the user via an interactive user interface, a type of guidance being offered to the user depending on how the enterprise resource planning application determined that the user needs the help; and responsive to determining that the navigation pattern of the user is consistent with a role-based navigation pattern for a role of the user with respect to the use of the enterprise resource planning application, performing, by the computing system:

determining, based on the historic usage data and any of the user-defined navigation patterns, whether a more efficient navigation pattern exists having fewer steps than the navigation pattern of the user, and responsive to determining that the more efficient navigation pattern exists, suggesting that the user use the more efficient navigation pattern, the suggesting further including instructions for using the more efficient navigation pattern.

2. The computer-implemented method of claim 1, wherein the differences in the navigation pattern of the user compared to the navigation patterns of the other users further comprises:

the differences in the navigation pattern of the user compared to navigation patterns of other users having a same role as the user with respect to the use of the enterprise resource planning application.

3. The computer-implemented method of claim 1, further comprising:

analyzing an order of tasks in a user-defined workflow;

determining, based on the historic usage data, an improved order of the tasks for an improved workflow as compared with the order of the tasks in the user-defined workflow; and suggesting to the user the improved order of the tasks when the improved order of the tasks is determined.

4. The computer-implemented method of claim 1, further comprising:

determining, based on the historic usage data, whether the navigation pattern of the user is inconsistent with a role of the user;

determining a next recommended action of the user based on the historic usage data and the role of the user when the navigation pattern of the user is determined to be inconsistent with the role of the user; and providing guidance to the user regarding the next recommended action when the navigation pattern of the user is determined to be inconsistent with the role of the user.

5. The computer-implemented method of claim 1, further comprising:

determining degradation in at least one key performance indicator over a predefined period of time;

determining an action to recommend based on the historic usage data and the determined degradation in the at least one key performance indicator over the predefined period of time; and recommending the action to the user via the interactive user interface.

6. The computer-implemented method of claim 5, further comprising:

providing, via the interactive user interface, a selectable object on one of the available display screens such that, when the user selects the selectable object, the recommended action is performed.

7. The computer implemented method of claim 1, further comprising:

allowing only an authorized user to perform at least one of:

defining an objective, defining one or more key performance indicators, and defining role-based navigation patterns.

8. A system that aids a user of an enterprise resource planning application, the system comprising:

at least one processing unit; and at least one memory connected to the at least one processing unit, wherein the at least one processing unit is configured to perform:

learning structures and workflows regarding the enterprise resource planning application based on historic usage data, system configuration data, and enterprise resource planning application configuration data, the learning further comprising:

analyzing the historic usage data to learn, via machine learning, role-based navigation patterns, role-based workflows, and user-defined navigation patterns;

determining that a user needs help using the enterprise resource planning application based on one or more of an occurrence of a timeout based on a lack of user input regarding the enterprise resource planning application, differences in a navigation pattern of the user as compared with navigation patterns of other users with respect to use of the enterprise resource planning application, and a relationship regarding the navigation pattern of the user and objectives;

upon determining that the user needs the help, providing guidance to the user via an interactive user interface, a type of guidance being offered to the user depending on how the enterprise resource planning application determined that the user needs the help; and responsive to determining that the navigation pattern of the user is consistent with a role-based navigation pattern for a role of the user with respect to the use of the enterprise resource planning application, performing, by the computing system:

determining, based on the historic usage data and any of the user-defined navigation patterns, whether a more efficient navigation pattern exists having fewer steps than the navigation pattern of the user, and responsive to determining that the more efficient navigation pattern exists, suggesting that the user use the more efficient navigation pattern, the suggesting further including instructions for using the more efficient navigation pattern.

9. The system of claim 8, wherein the differences in the navigation pattern of the user compared to the navigation patterns of the other users further comprises:

the differences in the navigation pattern of the user compared to navigation patterns of other users having a same role as the user with respect to the use of the enterprise resource planning application.

10. The system of claim 8, wherein the at least one processing unit is configured to perform:

analyzing an order of tasks in a user-defined workflow;

determining, based on the historic usage data, an improved order of the tasks for an improved workflow as compared with the order of the tasks in the user-defined workflow; and suggesting to the user the improved order of the tasks when the improved order of the tasks is determined.

11. The system of claim 8, wherein the at least one processing unit is further configured to perform:

determining, based on the historic usage data, whether the navigation pattern of the user is inconsistent with a role of the user;

determining a next recommended action of the user based on the historic usage data and the role of the user when the navigation pattern of the user is determined to be inconsistent with the role of the user; and providing guidance to the user regarding the next recommended action when the navigation pattern of the user is determined to be inconsistent with the role of the user.

12. The system of claim 8, wherein the at least one processing unit is further configured to perform:

determining degradation in at least one key performance indicator over a predefined period of time;

determining an action to recommend based on the historical usage data and the determined degradation in the at least one key performance indicator over the predefined period of time; and recommending the action to the user via the interactive user interface.

13. The system of claim 12, wherein the at least one processing unit is further configured to perform:

providing, via the interactive user interface, a selectable object on one of the available display screens such that, when the user selects the selectable object, the recommended action is performed.

14. The system of claim 8, wherein the at least one processing unit is further configured to perform:

allowing only an authorized user to perform at least one of:
defining an objective,
defining one or more key performance indicators, and
defining role-based navigation patterns.

15. A computer program product comprising:

at least one computer readable storage medium having computer readable program code embodied therewith for execution on at least one processor, the computer readable program code being configured to be executed by the at least one processor to perform:

learning structures and workflows regarding an enterprise resource planning application based on historic usage data, system configuration data, and enterprise resource planning application configuration data, the learning further comprising:

analyzing the historic usage data to learn, via machine learning, role-based navigation patterns, role-based workflows, and user-defined navigation patterns;

determining that a user needs help using the enterprise resource planning application based on one or more of an occurrence of a timeout based on a lack of user input regarding the enterprise resource planning application, differences in a navigation pattern of the user as compared with navigation patterns of other users with respect to use of the enterprise resource planning application, and a relationship regarding the navigation pattern of the user and objectives;

upon determining that the user needs the help, providing guidance to the user via the interactive user interface, a type of guidance being offered to the user depending on how the enterprise application determined that the user needs the help;

responsive to determining that the navigation pattern of the user is consistent with a role-based navigation pattern for a role of the user with respect to use of the enterprise resource planning application, performing, by the computing system:

determining, based on the historic usage data and any of the user-defined navigation patterns, whether a more efficient navigation pattern exists having fewer steps than the navigation pattern of the user, and responsive to determining that the more efficient navigation pattern exists, suggesting that the user use the more efficient navigation pattern, the suggesting further including instructions for using the more efficient navigation pattern.

16. The computer program product of claim 15, wherein the differences in the navigation pattern of the user compared to the navigation patterns of the other users further comprises:

the differences in the navigation pattern of the user compared to navigation patterns of other users having a same role as the user with respect to the use of the enterprise resource planning application.

17. The computer program product of claim 15, wherein the computer readable program code is further configured to be executed by the at least one processor to perform:

analyzing an order of tasks in a user-defined workflow;

determining, based on the historic usage data, an improved order of the tasks for an improved workflow as compared with the order of the tasks in the user-defined workflow; and suggesting to the user the improved order of the tasks when the improved order of the tasks is determined.

18. The computer program product of claim 15, wherein the computer readable program code is further configured to be executed by the at least one processor to perform:

determining, based on the historic usage data, whether the navigation pattern of the user is inconsistent with a role of the user;

determining a next recommended action of the user based on the historic usage data and the role of the user when the navigation pattern of the user is determined to be inconsistent with the role of the user; and providing guidance to the user regarding the next recommended action when the navigation pattern of the user is determined to be inconsistent with the role of the user.

19. The computer program product of claim 15, wherein the computer readable program code is further configured to be executed by the at least one processor to perform:

determining degradation in at least one of the key performance indicator indicators over a predefined period of time;

determining an action to recommend based on the historical usage data and the determined degradation in the at least one key performance indicator over the predefined period of time; and recommending the action to the user via the interactive user interface.

20. The computer program product of claim 19, wherein the computer readable program code is further configured to be executed by the at least one processor to perform:

providing, via the interactive user interface, a selectable object on one of the available display screens such that, when the user selects the selectable object, the recommended action is performed.

\* \* \* \* \*